(12) United States Patent
O'Hayer

(10) Patent No.: US 10,520,203 B2
(45) Date of Patent: *Dec. 31, 2019

(54) METHOD AND SYSTEM FOR CONTROLLING THE TEMPERATURE OF AN INDOOR SPACE

(71) Applicant: William Walter O'Hayer, South Bend, IN (US)

(72) Inventor: William Walter O'Hayer, South Bend, IN (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/284,530

(22) Filed: Oct. 3, 2016

(65) Prior Publication Data

US 2017/0102153 A1 Apr. 13, 2017

Related U.S. Application Data

(63) Continuation-in-part of application No. 14/877,917, filed on Oct. 7, 2015, now Pat. No. 9,638,429.

(51) Int. Cl.
  *G05D 23/19* (2006.01)
  *F24D 19/10* (2006.01)
  (Continued)

(52) U.S. Cl.
  CPC ............ *F24D 19/10* (2013.01); *G05D 23/19* (2013.01); *F24F 2110/12* (2018.01);
  (Continued)

(58) Field of Classification Search
  CPC ............ F24D 19/10; F24D 5/12; F24F 11/30
  See application file for complete search history.

(56) References Cited

U.S. PATENT DOCUMENTS 2,932,456 A 4/1960 Deubel
3,761,018 A 9/1973 Rekai
(Continued)

OTHER PUBLICATIONS

LenaWorks company website. Main page, savings, and origin pages. Also 'one page' reference.sheet. Retrieved from the Internet. <URL.:https://lena.works/>. [Retrieved on Nov. 6, 2019] (Year: 2019).*

(Continued)

*Primary Examiner* — Ljiljana V. Ciric
*Assistant Examiner* — Alexis K Cox

(57) ABSTRACT

A method for automatically operating a heating system controller for heating an indoor space so that the indoor temperature measurement signals are kept a) at approximately or above a default set point when the automatically obtained outdoor temperature indicator signals reflect an outdoor temperature indicator that is above a freeze protection point, or b) at approximately a computed set point that is higher than the default set point when the outdoor temperature indicator signals reflect an outdoor temperature indicator that is below the freeze protection point. The computed set point can be based on an outdoor temperature indicator. A heating system comprising a furnace, a thermostatic controller, a sensor of indoor temperature operatively connected to the thermostatic controller, a receiver operatively connected to the thermostatic controller for receiving a signal indicative of an outdoor temperature indicator, wherein the thermostatic controller is configured to operate according to the method.

13 Claims, 5 Drawing Sheets

(51) Int. Cl.
| | |
|---|---|
| G05D 23/00 | (2006.01) |
| F24F 130/00 | (2018.01) |
| F24F 130/10 | (2018.01) |
| F24F 110/12 | (2018.01) |

(52) U.S. Cl.
CPC ....... *F24F 2130/00* (2018.01); *F24F 2130/10* (2018.01); *G05D 23/00* (2013.01); *Y02B 10/70* (2013.01)

(56) References Cited

U.S. PATENT DOCUMENTS

| | | | |
|---|---|---|---|
| 4,289,272 | A | 9/1981 | Murase |
| 5,573,180 | A | 11/1996 | Werbowsky |
| 6,098,893 | A | 8/2000 | Bergland |
| 8,224,490 | B2 | 7/2012 | Knyazev |
| 8,543,244 | B2 | 9/2013 | Keeling |
| 8,851,393 | B1 | 10/2014 | Girgis |
| 2012/0259470 | A1 | 10/2012 | Nijhawan |
| 2013/0231792 | A1 | 9/2013 | Ji |
| 2013/0310989 | A1 | 11/2013 | Steinberg |
| 2014/0067132 | A1 | 3/2014 | Macek |
| 2017/0276393 | A1* | 9/2017 | Liu .................. F24F 13/22 |

OTHER PUBLICATIONS

Illinois state record of LenaWorks. Retrieved from the Internet <URL:https://inbiz.in.gov>. Retrieved Oct. 24, 2019. (Year: 2019).* http://simplisafe.com/freeze-sensor; Last accessed on Aug. 30, 2015; © 2014 SimpliSafe, Inc.
http://www.redcross.org/prepare/disaster/winter-storm/preventing-thawing-frozen-pipes; Last accessed on Oct. 3, 2015; Copyright 2015 The American National Red Cross.
https://learningcenter.statefarm.com/residence/maintenance/preventing-frozen-pipes/; Publication dated Feb. 15, 2011; Last accessed on Oct. 3, 2015.
https://www.erieinsurance.com/home-insurance/home-safety/prevent-freezing-pipes; Publication dated Jan. 26, 2015; Last accessed on Oct. 3, 2015.
http://www.iii.org/article/winter-weather-preparation; Last accessed on Oct. 3, 2015; Copyright 2015, Insurance Information Institute, Inc.
http://inspectapedia.com/plumbing/Winterize_Heat_On.htm; Last accessed on Oct. 3, 2015; 2015 Copyright InspectApedia.com.
http://www.protectedhome.com/deluxe-freezealarm-p-16-I-en.html; Last accessed on Oct. 3, 2015; 2015 Protected Home.
User Guide ecobee3; Last accessed on Sep. 5, 2015; Copyright 2014 ecobee.
http://www.houselogic.com/home-advice/plumbing/prevent-freezing-pipes/?search_link_clicked=How%20to%20Prevent%20Freezing%20Pipes; Last accessed on Oct. 3, 2015; Copyright 2015 National Association of Realtors.
http://www.ecsinsure.com/vacation-or-second-homes-and-freezing-pipes-be-aware/; Publication date Dec. 2, 2014; Last accessed on Oct. 3, 2015; 2014 Early, Cassidy & Schilling, Inc.

* cited by examiner

METHOD AND SYSTEM FOR CONTROLLING THE TEMPERATURE OF AN INDOOR SPACE

CROSS-REFERENCE TO RELATED APPLICATIONS

This application claims the benefit of U.S. Non-provisional application Ser. No. 14/877,917, filed Oct. 7, 2015 entitled "METHOD AND SYSTEM FOR CONTROLLING THE TEMPERATURE OF AN INDOOR SPACE" which is incorporated herein by reference in its entirety.

BACKGROUND

Field

This disclosure relates to heating control systems, and methods for controlling heating systems. More particularly, the disclosure describes heating control systems, and methods of controlling heating systems, which use weather information to achieve energy savings.

Description of Related Art

Thermostats and Heating Control Systems

Conventional temperature control systems often use thermostats to allow the user to create predetermined set points for indoor temperatures. A thermostat samples the temperature within a structure, and calls for heat or cooling from a heating, cooling, or HVAC system. Thermostats are used with all manner of heating, cooling and HVAC systems; and the settings on the thermostat are usually driven by considerations for the comfort or safety of the occupants of the structure. The temperature in a structure can be managed by one or more temperature control system, and by one or more heating, cooling or HVAC system. Either or both of the temperature control system or heating control system can be stand-alone, or can be a part of a building management system.

Current thermostats can be programmable to allow set points to be programmed for specific times of day, and for days of week. These times and set points can correspond to when the user expects the building to be occupied, when the occupants are expected to be away such as during the workday, or when they are typically asleep.

More recently-developed thermostats can regulate energy usage in response to peak demands on the power grid. Such thermostats call for, for example, less cooling in a structure when the power grid is at peak usage, and some thermostats of this type are also able to sense whether a structure is occupied, and even further reduce power consumption during times of peak demand if the structure is unoccupied.

Other recently-developed thermostats use the future occupancy status of the structure to determine set points for the temperature of the space. For example, a thermostat can receive a signal via the internet indicating that an occupant will soon arrive at the structure, and adjust its temperature set point accordingly. In other cases, based on historical data regarding occupants' movement in the structure, a thermostat will predict when the structure will be occupied, and adjust its temperature set point accordingly. For structures which are regularly occupied, these technologies, alone or in combination, are both energy efficient and ensure optimal comfort of the occupant of the structure.

Outdoor temperature, or forecasts thereof, are currently used by numerous heating control systems in a variety of ways, for example: to merely display the temperature to users, to calculate mechanical heat lag (MHL) to determine when a system needs to be activated to achieve a target temperature by a predetermined time, to determine the thermodynamic properties of a building, to evaluate the efficiency of a heating system over time, as a variable in a demand response system which primarily shifts start and stop times, as a variable considered in a fresh air ventilation (FAV) controller, or as an indicator of how energized a boiler system needs to be to have the thermal capacity to heat a space.

Unoccupied Structures

None of the above-described thermostat functionalities, however, addresses the need for energy-efficient heating of unoccupied structures. According to the U.S. Census Bureau estimates, there were approximately 17.3 million vacant housing units in the United States as of the first quarter of 2015.

In colder climates throughout the world, such unoccupied structures are unnecessarily heated in order to prevent damage to the structure from cold, in particular from freezing pipes. Second homes, vacation homes, offices, any structures left unoccupied for extended periods, and even particular zones within a structure that are expected to have longer periods of time where they are unoccupied, can benefit from a system which will heat the space within the structure enough to prevent damage from cold, without unnecessarily heating the space. In these situations, the comfort of an occupant is not the objective; rather, a combination of energy savings and prevention of damage to the structure caused by the temperature is. Currently, the temperature in such unoccupied structures is usually set to a single pre-selected set point, and the space within the structure is kept consistently at that temperature. In colder climates, this pre-selected set point is selected because it will keep the space within the structure warm enough to prevent damage to the structure from cold, for example from freezing pipes. A typical fixed setting of 50-65 degrees Fahrenheit is often selected for such situations. (The lowest recommended setting, per the American Red Cross, as well as major insurance companies and others, is to 55 degrees Fahrenheit while buildings are vacant.) Such a setting is high enough to keep the unoccupied structure safe during periods of extremely low temperatures, when there is a risk of damage to the structure, for example from freezing pipes. Decreasing the indoor temperature from 68 degrees Fahrenheit to 55 degrees Fahrenheit (a difference of 13 degrees Fahrenheit) produces estimated savings of 39% in these unoccupied structures. (The U.S. Department of Energy estimates up to 1% savings on heating for each 1 degree Fahrenheit of setback for an eight hour period. Estimating savings for unoccupied spaces over a whole day would therefore mean 24 hours per day savings or 3% savings per 1 degree setback.)

In times of only moderately low temperatures, however, for example, when outdoor temperatures are 35-50 degrees Fahrenheit, a thermostat setting of 55 degrees Fahrenheit causes heating of the unoccupied structure which is not necessary to prevent damage. A further 15-20 degree reduction in indoor temperature set point (from 55 to 40 or 35 degrees Fahrenheit) could yield significant savings: approximately 45-60% of the estimated energy currently being expended to heat unoccupied homes. Therefore, a vast amount of energy is wasted worldwide. On most days, structures that are expected to be unoccupied for longer periods are kept much warmer than would be necessary to prevent plumbing and property damage.

In many unoccupied structures, the default temperature setting, and therefore the amount of energy used to heat the space, could be dramatically lowered if the thermostat in the structure could reliably and automatically adjust the thermostat set point upward when outdoor temperatures decline and the chance of damage from cold increases. Currently, heating control systems are not available with this functionality. There therefore remains a significant need for a method of controlling the heating of a structure which considers outdoor temperature and provides enough heating to prevent damage to the structure from cold, but without expending unnecessary energy.

SUMMARY

The present disclosure provides a method for controlling a heating system. The method can include obtaining an outdoor temperature indicator signal in proximity to the heating system and an indoor space. When the outdoor temperature indicator is at or above a freeze protection point; a chosen set point is selected by selecting a default set point. When the outdoor temperature indicator is below a freeze protection point, the method can include determining a computed set point based on the outdoor temperature indicator, comparing the computed set point to the default set point and a maximum set point and selecting a chosen set point by selecting (1) the default set point if the computed set point is below the default set point, (2) the computed set point, if the computed set point is between the default set point and the maximum set point, or (3) the maximum set point, if the computed set point is above the maximum set point. The method can further include controlling the heating system to regulate the temperature of the indoor space according to the chosen set point.

In controlling a heating system, the computed set point can increase monotonically as the outdoor temperature decreases. The computed set point can be further based on one or more scaling factors. Such a scaling factor can be selected from the group consisting of a first order factor and a higher order factor.

In controlling a heating system, the outdoor temperature indicator can be selected from a measured outdoor temperature, a forecasted outdoor temperature, a calculated outdoor wind chill, and a forecasted outdoor wind chill. If the outdoor temperature indicator is not available, the heating system can select a fail-safe set point. The outdoor temperature indicator signal can be obtained via a network, such as the Internet; and can be a temperature obtained from a weather data provider or an outdoor temperature sensor co-located at the site of the indoor space.

The present disclosure further provides a heating control system. The heating control system can include at least one user interface. The heating control system can include at least one computer. The computer can be programmed to obtain an outdoor temperature indicator signal in proximity to the heating system and an indoor space. When the outdoor temperature indicator is at or above a freeze protection point, the heating control system can select a chosen set point by selecting a default set point. When the outdoor temperature indicator is below the freeze protection point, the heating control system can determine a computed set point based on the outdoor temperature indicator, compare the computed set point to the default set point and a maximum set point, and select the chosen set point by selecting (1) the default set point if the computed set point is below the default set point, (2) the computed set point, if the computed set point is between the default set point and the maximum set point, (3) the maximum set point, if the computed set point is above the maximum set point. The heating control system can then control the heating system to regulate the temperature of the indoor space according to the chosen set point.

In the heating control system, the computed set point can increase monotonically as the outdoor temperature decreases. The computed set point can be further based on one or more scaling factors. Such a scaling factor can be selected from the group consisting of a first order factor and a higher order factor.

In the heating control system, the outdoor temperature indicator can be selected from a measured outdoor temperature, a forecasted outdoor temperature, a computed outdoor wind chill, and a forecasted outdoor wind chill. If the outdoor temperature is not available, the heating system can select a fail-safe set point. The outdoor temperature indicator can be obtained via a network, such as the Internet, and can be a temperature obtained from a weather data provider or an outdoor temperature sensor co-located at the site of the indoor space.

BRIEF DESCRIPTION OF THE DRAWINGS

The inventive body of work will be readily understood by referring to the following detailed description in conjunction with the accompanying drawings, and as set out in the appended claims.

DETAILED DESCRIPTION

Figure 1:
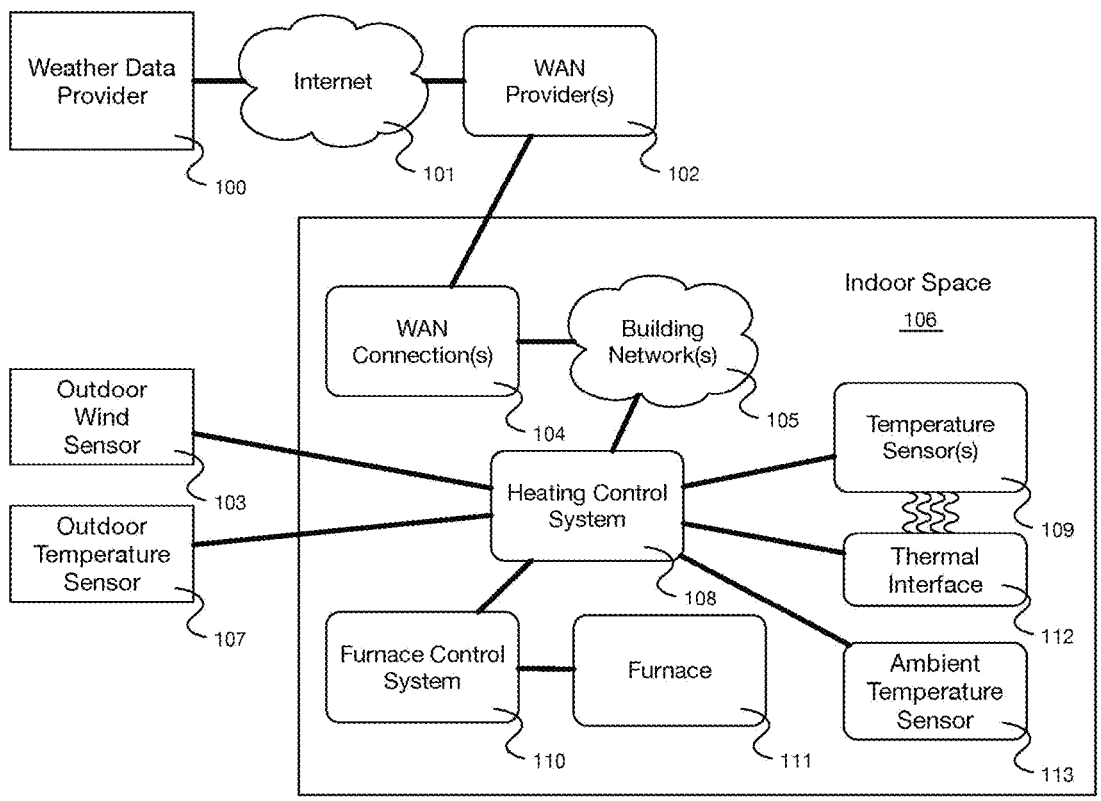
FIG. 1 is a diagram showing the data flow for on-site temperature, heating control system signaling, user interfaces, and Internet weather information.

In colder climates, the freezing and subsequent bursting of pipes can be a significant problem. In an occupied structure, such as a home or office, the space within the structure is usually heated sufficiently to keep the occupants of the structure comfortable. Temperatures that are high enough to keep the occupants of a structure comfortable, for example, a temperature at or above 65 degrees Fahrenheit, are usually sufficient to prevent damage to the structure due to cold, for example, to prevent the pipes within the structure from freezing.

In unoccupied structures, however, for example in homes in which no one is resident, or unoccupied commercial or storage structures, the temperature is usually kept at a fixed point, and left for the duration of the time that the structure remains unoccupied. The reason for this action is to prevent damage from extremely low temperatures inside the structure; specifically, to prevent the freezing of water in, and subsequent bursting of, pipes. A reasonable set point for an unoccupied structure using a standard thermostat is often between about 50-65 degrees Fahrenheit. Such a set point means that when outdoor temperatures are at or above about 32 degrees Fahrenheit, but the temperature inside the structure is below the 50-65 degree Fahrenheit thermostat set point, the thermostat continues to call for heat even though it is not needed to prevent the structure's pipes from freezing. Such an arrangement can result in a significant amount of unnecessary heating, and consequently of unnecessary energy use, and resulting greenhouse gas emissions.

The method and system disclosed herein cause increases in the indoor temperature of a structure in an inverse relationship to the outdoor temperature during periods of colder weather, for example, when there is a danger of damage to the indoor space from cold weather.

The present disclosure provides a method and apparatus to address the problem of unnecessary heating of unoccupied structures. A structure comprises indoor space, or simply "space," in which objects, animals or people can be disposed. The indoor space is separated from outdoor space by one or more walls. As used herein, the term "wall" does not require that the wall extend vertically or substantially vertically. Rather, walls can extend horizontally or substantially horizontally, such as in the case of a floor or a ceiling; or walls can extend neither vertically nor horizontally, such as a pitched roof.

The method described herein can be used to control the temperature in any suitable indoor space. Suitable indoor spaces include, but are not limited to, a residence, a commercial building, and a moveable space. A residence can be, but is not limited to, one or more of a detached home and a multi-family residential dwelling. A multi-family residential dwelling can be, but is not limited to, one or more of a duplex, a semi-detached home, a townhouse, an apartment, a condominium and a co-op. A commercial building can be, but is not limited to, one or more of an office space, an office building, a retail space, an industrial building and a storage building. A moveable indoor space can be, but is not limited to, one or more of a train wagon, a ship, a boat, an airplane, a recreational vehicle and a mobile home.

In one embodiment, the system can be configured to function in a vacant building, for example one which can be for sale or rent, and which does not have wireless Internet service. In these circumstances, it is anticipated that remote communication with the system can be accomplished through a cellular telephone network or other wireless technology, either directly with the heating control system, or via a separate apparatus within the building and in proximity to the heating control system, and communicating with the heating control system either through a wired connection, or through a wireless method or via a thermal interface. The cost of such a simple configuration is anticipated to be modest in comparison to the energy savings to be realized by implementing the present invention.

The method can be implemented on an apparatus (a heating control system; eg, a thermostat) already resident in the structure, or can be implemented by one or more heating control system designed specifically to implement the method. The present disclosure provides a method for providing sufficient heat to a structure to prevent damage from cold temperatures or freezing pipes, while decreasing the overall energy usage of the structure.

Structures are heated or cooled by heating or cooling systems, respectively; and can be both heated and cooled by an integrated heating and cooling system such as a HVAC (heating, ventilation and air conditioning) system. The present technology concerns itself with heating an indoor space, and therefore with a heating system or the heating component of an HVAC system. A heating system comprises at least one heating mechanism (for example, a furnace) as well as a way to heat directly, such as electric resistance heat, or moving a heated fluid such as air or water through the structure. A heating system can be a heat-only system, or, for the purposes of this disclosure, the heating components of an HVAC system, either of both which meanings, as well as equivalents thereof, are encompassed by the use of "heating system" herein.

The methods and systems disclosed herein can be used with any type of heating system. The heating system can be a heat-only system. The heating system can be a heating, ventilation and air conditioning (HVAC) system. The heating system can be a forced-air system. The heating system can be a radiant heating system. The radiant heating system can comprise one or more of electric resistance heat elements, traditional radiators, under-floor heating elements, and behind-wall heating elements. The heating system can be produce heat in any way known to those skilled in the art. The heating system can, for example, use electricity, or burn fuels such as natural gas, LP, propane or fuel oil.

A heating system comprises at least a furnace and a furnace control system. As used herein, the term furnace is a generic term encompassing the heating element of all types of heating systems. "Furnace," as used herein, includes but is not limited to a furnace, a boiler, a heat pump, an electrical resistance heater, a geothermal based system, a solar system, a wood-burning heater, a fossil fuel-burning heater, and other types of heating systems.

Furnaces are activated by a furnace control system. The furnace control system can receive signals from a heating control system. The heating control system is usually, though not always, separate from the furnace control system. The heating control system can be connected to the furnace control system by wired circuits, wireless apparatus, optical fibers, or any other method that allow signaling to call for heat.

A heating system can be controlled by a heating control system. Generally, heating control systems provide a way for a heating system to respond to user requirements for an indoor space to be maintained at a particular temperature. Heating control systems can comprise at least one thermostat. The thermostat can read the temperature in the indoor space in which it is installed, compare that temperature to a pre-selected set point, and then, optionally, relay the need for heating to the furnace control system. The furnace can then provide heat until the thermostat reads the temperature in the indoor space as equal to, or within a pre-selected range of, the set point.

In one embodiment, the methods described herein are implemented on, by, or in conjunction with a heating control system. The heating control system can be co-located with the structure requiring heating, or can control the heating system at the structure from a different physical location. In the case that the heating control system controls the heating system from a different physical location, the heating control system and the heating system can be in communication through any method, including but not limited to electronic communication such as a wired or wireless internet connection, satellite, cellular telephone or standard telephone network.

In general, the present disclosure provides a method for controlling a heating system. Controlling the heating system of an indoor space can comprise controlling the furnace control system to determine the temperature to which the indoor space serviced by the heating system is managed. Control of the heating system can be accomplished by positive control or negative control. In the case of positive control, controlling involves either calling for heat or selecting a predetermined set point managed by the furnace control system. Negative control is prevention of the normal operation of the furnace control system (calling for heat). The heating control system can be directly connected to the furnace control system. Alternatively, the heating control system can be connected to the furnace control system through an existing temperature control apparatus such as a thermostat.

In one embodiment, a heating control system can be connected to an existing temperature control apparatus through a thermal interface. The thermal interface can produce heat, causing the temperature measuring devices of the existing temperature control apparatus to register a higher temperature than the ambient temperature of the space, thereby preventing the activation of the furnace control system that would otherwise occur. This is an example of negative control.

The method can comprise obtaining a reading for an outdoor temperature (To) indicator in proximity to at least one of the heating system and an indoor space. A reading for an outdoor temperature can be a representation of the outdoor temperature immediately outside the indoor space, or at an outdoor location in proximity to at least one of the heating system, and the indoor space which is being heated thereby. As used herein, "outdoor" is synonymous with "external", "outside", "atmospheric", and other like terms. "Outdoor temperature," "outdoor weather data," "measured outdoor weather data" and other like terms include at least one of temperature and wind speed.

An outdoor temperature indicator, as understood in the disclosure and the appended claims, can be any temperature which is reasonably representative of the outdoor weather conditions, including temperature, in proximity to, at or near the indoor space. For example, an outdoor temperature indicator can be an outdoor temperature which is directly measured, or can be a computed outdoor temperature or computed outdoor wind chill which is computed from outdoor weather data which is itself directly measured. An outdoor temperature indicator can be an outdoor temperature which is obtained in real-time, or can be a forecasted outdoor temperature or forecasted computed outdoor wind chill. "Computed outdoor weather data" or "computed outdoor wind chill" and other like terms are understood to be computed based on measured outdoor weather data, including at least one of outdoor temperature or outdoor wind speed. The computations performed to provide a forecast of outdoor temperature, a computed outdoor wind chill, or a forecast based on temperature and wind speed can be performed at the site at which the outdoor weather information is gathered, at the site of a structure requiring heating, or at any other site capable of performing such computations. The measured or computed outdoor weather data can be measured or computed as an integer, or measured or computed as a real number having one or more decimal places.

In one embodiment, wind chill can be computed by methods standard in the art. For example, wind chill can be computed as in Equation 1.

$$\text{Wind Chill} = 35.74 + 0.6215T - 35.75(V^{0.16}) + 0.4275T(V^{0.16})$$

Where T is the outdoor air temperature in degrees Fahrenheit, and V is the outdoor wind speed in miles per hour.

The measured outdoor weather data, including but not limited to at least one of temperature and wind speed, can be measured by a sensor. The sensor can be located at a site in proximity to the structure requiring heating. "In proximity to" is understood as encompassing one or more sites co-located with the structure requiring heating as well as encompassing one or more sites having outdoor weather which is representative of the weather at the structure requiring heating. A site or sites co-located with the structure is within five miles of the structure, and ideally, within 100 yards, 10 yards, 5 yards, or 1 yard of the structure. The site or sites can be chosen based on various factors, including but not limited to, exposure to outdoor wind and exposure to sun. Sites "in proximity to" a structure requiring heating should be representative of the weather data at the site of the structure requiring heating. For the purposes of this disclosure, "representative" weather data can be obtained from any source which collects such data, including a weather data site such as a National Weather Service site within 50 miles, 100 miles, or in some circumstances, up to 200 miles, of a site, and can be obtained via a network such as a wired or wireless internet connection, satellite, cellular telephone or standard telephone network.

When possible, one of the indoor temperature sensors can be considered a cold spot sensor. A cold spot sensor is an indoor temperature sensor that can be placed in the indoor space where there is elevated concern about possible damage from colder temperatures. The indoor temperature indicator signals received from a cold spot sensor can be used by the heating system controller to modify the computed set point compution, or as a trigger to override the usual logic of the controller to run the heating system to protect the indoor space and its contents from damage from cold temperatures.

Sensors can also be placed inside a wall cavity to measure the temperature therein. Readings from these sensors can also be a factor in computing an outdoor temperature indicator. This information can be used by the heating system controller to determine or modify the computed set point compution, or it can be used as a trigger to override the usual logic of the controller to run the heating system to protect the indoor space and its contents as well as the wall cavity and its contents from damage due to cold temperatures.

One embodiment of the system can use multiple sensors to take temperature readings of walls, those separating the indoor space from the outdoors known as exterior walls (including windows and doors), as well as those separating two indoor spaces. The temperature of the exterior wall(s) as well as the differences between exterior and interior walls can be considered yet another outdoor temperature indicator, recorded over time and can be utilized by the system like other outdoor temperature indicators in determining whether the heating system can be turned off, whether the default set point can be utilized, or as a factor in determining a computed set point. Outdoor temperature readings can be correlated to these readings over time in order to calibrate the system and estimate the outdoor temperature. This method estimates outdoor temperature rather than simply obtaining it directly, so has inherent in it estimation error. However, it has some utility in that once the system is calibrated, there is no ongoing need for obtaining other outdoor temperature indicators.

Indoor temperature indicator signals can be obtained from multiple sensors. Measurements can be saved by the heating system controller over time. Outdoor temperature indicator signals can also be obtained from multiple sensors. In addition to the method running in real time, temperature readings can be saved over time by the heating system controller to facilitate the generation of forecasts of outdoor temperature indicators, based on forecasts of temperature, or based on forecasts of temperature combined with forecasts of wind speed.

When the heating system is controlled based on outdoor weather data obtained at a site in proximity to the structure comprising the heating system or the indoor space, the measured outdoor temperature can be provided directly, electronically via a network, such as a LAN network, a WAN network, the Internet (either wired or wirelessly), by Bluetooth, satellite, cellular phone network, standard telephone service, a wireless mesh network, or by any combination of these methods.

In conjunction with its primary function of controlling the temperature of the indoor space, the heating system controller can utilize other types of sensors such as motion, sound, temperature, humidity, smoke, carbon monoxide, and water, to report status updates and send alerts regarding various detected states within the structure. This functionality can provide additional overall monitoring of the indoor space and provide information for any person who is responsible for remotely managing an unoccupied indoor space. These reports and alerts can be sent in conjunction with any of the hardware which can make up a heating control system, such as a central alarm security system that is running some or all of the method. Any system running the method can be configured to send these same alerts to the user with or without notifying law enforcement or a fire department. Reports and alerts can be in many forms, including but not limited to, an audible notification, a voice notification, a text, a telephone call, an email, or any other method that can transmit this information to a user.

Once obtained, the reading for an outdoor temperature indicator can be compared to a freeze protection point (P). The freeze protection point can be pre-determined, or set by the user of the system or of the method. The freeze protection point can be 32 degrees or any temperature below which it is advisable to further determine the need for additional heating of the indoor space. The freeze protection point is a reference value used in determining if the default temperature can be chosen as the set point or if the system can be put into a standby mode. For outdoor temperatures above the freeze protection point, the default set point can be considered adequate to protect the indoor space from damage from low temperatures. In lieu of use of a specific set point, the system controller can have the heating system off, i.e. in standby mode. During these times, significant amounts of energy can be saved by utilizing the default temperature set point or standby mode, as compared to systems that use a conventional fixed setting that does not have the ability to adjust energy consumption based on outdoor temperature.

When the outdoor temperature is at or above the freeze protection point, the heating control system does not call for heat from the heating system unless the indoor temperature is below the default set point. The lower the freeze protection point is set, the greater the energy savings that the system and method deliver to the user.

When the outdoor temperature is below the freeze protection point, the heating control system can determine a computed set point (C) based on the outdoor temperature indicator. Determining a computed set point can be done mathematically, or by performing a set of logical steps, ie, as a logical function. One non-limiting example of such a logical-function analysis can be: IF outdoor temperature=20, THEN determine C to be 44. Another example of a logical-function analysis can be: IF outdoor temperature >=32, THEN determine C to be 36, ELSE determine C to be 55. The result of such a logic function analyses can be a set of points that look like a stepped function (810) such as that shown in FIG. 8.

The computed set point can be an integer, or a real number having one or more decimal places. The computed set point can increase monotonically as the outdoor temperature decreases below the freeze protection point. Those having ordinary skill will recognize that the rate of change of the computed set point, referred to herein as a scaling factor (s), can vary across various ranges of outdoor temperatures, producing a set of computed set points in response to changes in outdoor temperature that, when graphed, produce a curved line (830). The scaling factor can be an integer, or a real number having one or more decimal places. A scaling factor can be about 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. The computed set point can be determined using a linear function, or it can utilize one or more higher order factors resulting in a curved function.

The computed set point can be compared to a default set point (D). The default set point can be any temperature close to freezing, but which has been determined to be a temperature at which the structure and/or its contents will not be damaged. When protecting against damage caused by the freezing of water, such as water standing in pipes, preferably, the default set point is one, two, three, four or five degrees above freezing, or 33, 34, 35, 36 or 37 degrees Fahrenheit; or from six to ten degrees above freezing, or 38, 39, 40, 41, or 42 degrees Fahrenheit. In the non-limiting embodiment shown in FIG. 4, the default set point for the heating control system is 36 degrees Fahrenheit. The default set point is the lowest set point to which, when the method is being used, the heating control system can be set.

When default temperatures are configured which are within a few degrees of the freeze protection point, the heating system should run for only a very small percentage of the time. During most time periods across the heating season, it should not run at all and in many cases the heating system is off.

The computed set point can be compared to a maximum set point (M). The maximum set point is the highest set point to which, when the method is being used, the heating control system can be set.

A chosen set point can be selected. The chosen set point is the point to which the heating control system controls the heating system to provide heat the indoor space. The chosen set point is selected by selecting one of: (1) the default set point if the computed set point is below the default set point; (2) the computed set point, if the computed set point is between the default set point and the maximum set point; or (3) the maximum set point, if the computed set point is above the maximum set point. Generally, the chosen set point increases as outdoor temperature decreases below the freeze protection point. See FIG. 8 for several examples of ways in which the chosen set point can increase as the outdoor temperature decreases.

The chosen set point can be determined using one or more scaling factors other than 1.0 to create a more or less rapid change in the modulation of the indoor set point in response to changing outdoor temperature indicators.

One or more of the default set point and maximum set points can be set at a point in time prior to the outdoor weather data being obtained, or one or more of the default set point and maximum set points can be set at a point in time subsequent to the outdoor weather data being obtained.

The heating control system can utilize historical temperature information, both indoor and outdoor, to compute outdoor temperature indicators such as a forecasts. This information can also be utilized to suggest to the user changes to any user determined parameters. For example, the system may suggest a change to the default set point in order to avoid unnecessary running of the heating system. In another embodiment, the heating control system can suggest a change to the scaling factor, i.e. the rate of change in computed set point in relation to a change in outdoor temperature indicator. The heating control system can suggest changes to the maximum set point. The heating system controller can also send notifications to the user or multiple designated recipients. These notifications can include, but are not limited to, information regarding the status of the outdoor temperature indicators, the indoor temperature indicators, the trends for each, and the trend in the differences between indoor and outdoor temperature indicators. The heating system controller can send alerts when certain limits are reached. The heating system controller can estimate savings using techniques known in the art and also report estimated savings to users.

Persons of ordinary skill in the art will recognize that it is also possible to apply logic similar to that described supra, but that determines a computed set point without comparing the outdoor temperature to a freeze protection point. In this scenario, the computed set point can be determined and result in a negative (less than zero) or positive (above zero) value depending on the outdoor temperature.

When one or more of outdoor weather data, a computed set point or a chosen set point cannot be computed or obtained, a fail-safe set point (F) can be selected (325). The fail-safe set point can be set prior to practicing any or all other steps of the method, or at any point during the practice of the method. The fail-safe set point can be set by the user at the time of failure of one or more of the steps of the method. A heating control system implementing the method can advise a user of the heating control system that the fail-safe set point needs to be set. A heating control system can advise a user of the heating control system that the fail-safe set point has been engaged. A fail-safe set point can be in the range of 40-65 degrees Fahrenheit, or it can be any other specific temperature setting which the user defines. A different fail-safe set point can also be set for each month or even week of a heating season. For example, when choosing a fail-safe temperature for an indoor space in Alexandria, Va., one can choose a higher fail-safe temperature such as 60 degrees for the colder winter months of December, January, and February, but choose lower fail-safe temperatures for November and March such as 50 degrees, and possibly even lower fail-safe temperatures for October and April such as 45 degrees.

The present disclosure provides a heating control system. The heating control system can comprise at least one user interface, and at least one computer programmed to implement the steps of the method disclosed herein. The user interface can allow a user to program the heating control system, including but not limited to programming at least one of a failsafe set point, a default set point, and a maximum set point. The computer can be a general purpose computer; or it can be a specific purpose computer, programmed specifically to implement the steps of the disclosed method. The computer can store one or more of a user input or an outdoor temperature reading in a non-transitory medium. The computer that performs the logical or mathematical operations of the method can comprise a general purpose computer, and can also utilize application specific integrated circuits (ASIC), field programmable logic arrays (FPGA), or any other implementation to perform all or part of the method.

For purposes of this application, thermostatic controller can be used synonymously with heating system controller. The functions of a heating system controller can be distributed across multiple hardware and systems. For example, user interface functions can be executed by the heating system controller, using voice enabled systems included with the system, or in conjunction with other systems such as a digital home assistant, for example the Amazon Echo, or combinations thereof. Additionally, other "always on" voice activated systems such as Siri, can also be employed and operate on various digital devices including but not limited to mobile phones. These systems can run on most any device which has the processing power to support the functions. Just like the interface functions, the logical and computing functions of the heating system controller can also be distributed to various systems. Thereafter, control signals must eventually be transferred to the heating system, usually through the furnace's control system. When the heating system controller functions are performed by systems other than thermostats, the control signals can be sent directly to a furnace control system or furnace which is able to receive such signals without being routed through a thermostat. These signals can be wireless. The furnace can also send operating information back to the system performing the heating system controller functions for reporting purposes.

All of the functions of a heating system controller can take place on or in conjunction with, and across any number of devices and systems. These functions can be performed on or in conjunction with a security system such as commonly known brands such as Simplisafe or ADT, a smart home automation hub such as Samsung's SmartThings, an audio visual management system such as a Crestron system, a building management/automation system, a standard thermostat, and combinations thereof.

Generally, the heating control system can obtain a reading for an outdoor temperature indicator signal in proximity to the heating system and an indoor space. When the outdoor temperature indicator is at or above a freeze protection point, the heating control system can select a chosen set point by selecting a default set point. Alternatively, when the outdoor temperature indicator is below the freeze protection point, the heating control system can determine a computed set point based on the outdoor temperature indicator, compare the computed set point to the default set point and a maximum set point, and select the chosen set point by selecting (1) the default set point if the computed set point is below the default set point, (2) the computed set point, if the computed set point is between the default set point and the maximum set point, or (3) the maximum set point, if the computed set point is above the maximum set point. Once the chosen set point has been selected, the heating control system can control the heating system to regulate the temperature of the indoor space according to the chosen set point.

The exact mathematical or logical function for computed set point and the particular values chosen for the parameters, while important for optimizing savings for a particular individual site and application, have only a minor impact on the overall results of the method. Regardless of the exact function used, substantially the same protective benefits and energy savings will be produced. The method, and any apparatus using the method in conjunction with a heating system, will realize the majority of the energy savings by enabling the use of a deep set back temperature, referred to herein as the default set point, across a wide range of outdoor temperatures prevalent during the heating season in many geographic regions, because the automatic adjustment feature will engage to provide protection needed when freezing weather occurs or is expected to occur.

Turning now to the figures.

FIG. 1 shows a representative schematic of a structure in which the disclosed system and method can be used, including non-limiting placement of the elements of the system in physical space.

A heating control system (108) can control a heating system. The heating system can comprise a furnace (111) and a furnace control system (110), as defined herein.

The heating control system (108) can interact with one or more outdoor temperature sensor (107), which can sense the outdoor temperature at a location in proximity to an indoor space (106), or with one or more outdoor wind sensor (103), which can sense the outdoor wind speed at a location in proximity to the indoor space; or both. The heating control system (108) can interact with one or more wide area network (WAN) connections (104), either via a building network (105) (shown in FIG. 1) or directly (not shown). The WAN network can receive a reading for an outdoor temperature relayed from a weather data provider (100) through the Internet (101) and a WAN provider (102). The heating control system (108) can interact with one or more temperature sensor (109), which can interact with a thermal interface (112). The heating control system (108) can interact with one or more ambient temperature sensor (113).

The heating system can be located in the same indoor section of the structure, or it can be located in a different location in the structure from the heating control system (108).

The heating control system (108) can optionally include an apparatus that controls the existing temperature control system through its temperature sensor (109). This can be accomplished by controlling the apparent temperature the existing temperature control system reads from the original temperature sensor. A thermal interface (112) can generate heat in proximity to the original temperature sensor (109) and the apparatus can thereby control the actual ambient temperature through the use of the set point of the original temperature control system. In this embodiment, the apparatus can use one or more additional temperature sensor (113) to measure the actual temperature of the indoor space (106).

For example, when a constant 55 degree set point is set for an existing temperature control system, the heating control system of the present invention, using a thermal interface, can provide heat to the original temperature sensor resulting in that sensor, and thereby the existing temperature control system, to read an apparent temperature above 55 degrees. The existing temperature control system would thereby refrain from calling for heat. In this example, the heating control system of the present invention effectively controls the ambient temperature by deceiving the existing temperature control system. In one embodiment where the existing temperature control system is a thermostat, the method and system of the present invention can be employed by adding the heating control system and a simple apparatus, a thermal interface, and without replacing the installed thermostat. This embodiment can enable simplified and low cost implementation of the heating control system of the present invention in situations where replacing a thermostat is an undesirable option such as when a building is for sale or rent and is planned to be vacant for a short period of time.

Figure 2:
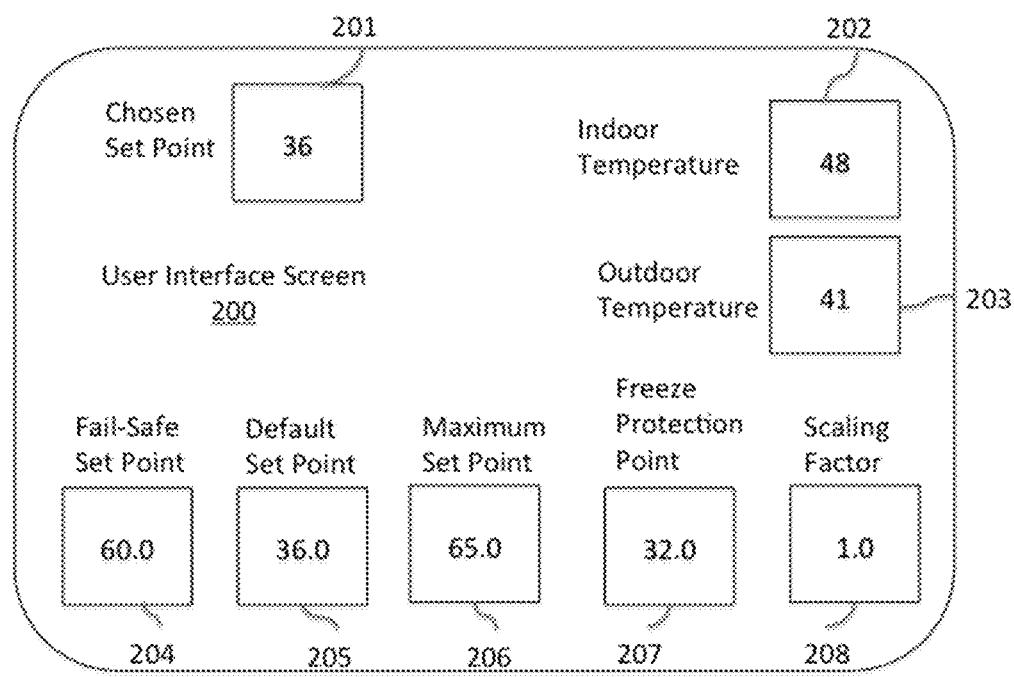
FIG. 2 is a diagram showing a possible configuration for a user interface screen for the method.

FIG. 2 illustrates a non-limiting example of a user interface screen (200). The current indoor temperature is displayed (202) along with the outdoor temperature (203). Across the bottom are icons for setting parameters for fail-safe set point (204), default set point (205), maximum set point (206), freeze protection point (207), and scaling factor (208). In the upper left, the chosen set point (201) is shown.

Figure 3:
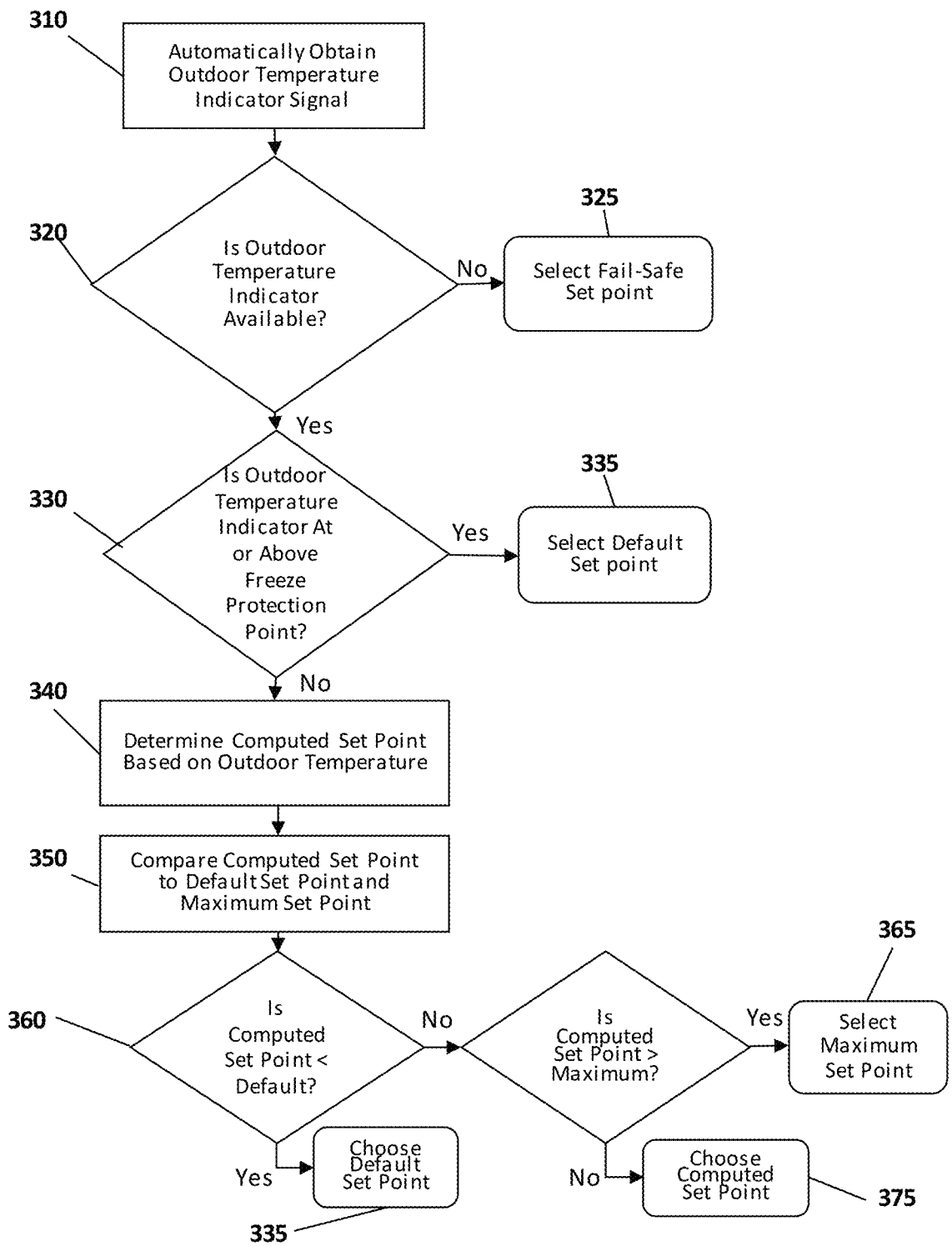
FIG. 3 is a flow diagram showing an exemplary functional logic which the heating control system can employ.

FIG. 3 shows the general method disclosed herein, and which a system of the present disclosure can implement. As a general first step, a system can automatically obtain or attempt to obtain an outdoor temperature indicator signal (310). The reading can be obtained at any site in proximity to a structure in which the method is being implemented. If the outdoor temperature is not available (320), a fail-safe set point is selected (325). The fail-safe set point is any set point for a heating control system which is believed to adequately protect a structure against damage from any cold temperature. If the outdoor temperature indicator is available (320) and is at or above the freeze protection point (330), the default set point is selected (335), or the heating system can also be turned completely off, i.e. not operated to any specific set point. In the non-limiting embodiment where the heating system is turned off, the controller continues to monitor indoor temperatures and operates the system in a standby mode. The default set point can be pre-set or is any set point which the user defines, and which is low enough to achieve significant energy savings as compared to systems which use standard fixed set points, for example 50-65 degrees, for unoccupied structures. The use of this relatively low default set point is possible by the automatic adjustment to set point when colder outdoor temperatures occur. Examples of this will be discussed below. If the outdoor temperature indicator is lower than the freeze protection point (330), then the computed set point is determined based on outdoor temperature indicator (340).

In an exemplary, non-limiting embodiment, the computed set point can be calculated (340) as $C=(32-To)s+32$, where:

s=scaling factor; any real number between and including about 0.3 and about 3.0

To=outdoor temperature

If the outdoor temperature indicator is below the freeze protection point, the computed set point is determined (340) based on outdoor temperature, forecast of outdoor temperature, wind chill, or forecasted wind chill, and compared (350) to the default set point, which essentially serves as the minimum set point, as well as a maximum set point, above which the set point will not be permitted. The default set point is chosen (335) if the computed set point is less than the default set point (360). The computed set point is chosen (375) if it is between the default set point and the maximum set point. The maximum set point is chosen (365) if the computed set point is above the maximum set point. The heating control system controls the heating system to regulate the temperature of the indoor space to the chosen set point.

The general logic of a method for controlling a heating system, and which can be implemented on a heating control system, is shown in FIG. 3. One skilled in the art will recognize that, once the reading for an outdoor temperature indicator is obtained, the order of the logical steps can be altered somewhat, while achieving substantially the same result. For example, the outdoor temperature indicator can be obtained and then compared to a freeze protection point first, as shown, to determine whether the default set point can be used. If the outdoor temperature indicator is low enough that the default set point is not used, a computed set point can then be determined and compared to the default set point and the maximum set point and a chosen set point can be chosen. Alternatively, the computed set point can be determined, without comparison to a freeze protection point, based on the outdoor temperature indicator and then compared to the default set point and maximum set point temperatures to determine a chosen set point. The resulting chosen set point is the same.

Figure 4:
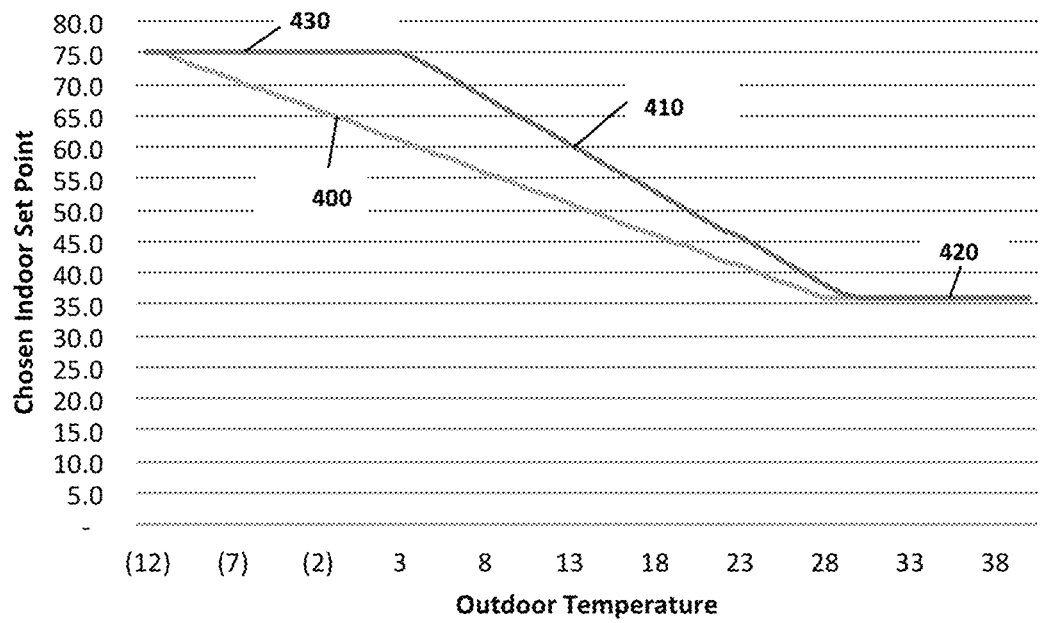
FIG. 4 is a graph illustrating the inverse relationship between heating system set points and various outdoor temperature readings that can result from activating the heating control system during periods of colder outdoor temperatures. It shows in detail two exemplary mathematical functions that can result from using the described method.

FIG. 4 shows two examples of graphical representations of the chosen set point produced by the method described herein. Both lines show a default set point (420) of 36 and a maximum set point (430) of 75. One line shows line slope resulting from a scaling factor of 1.0 (400), while the second shows a steeper line (410) with a scaling factor of 1.5 which, in effect, raises the computed indoor set point more quickly in response to falling outdoor temperature.

Figure 5:
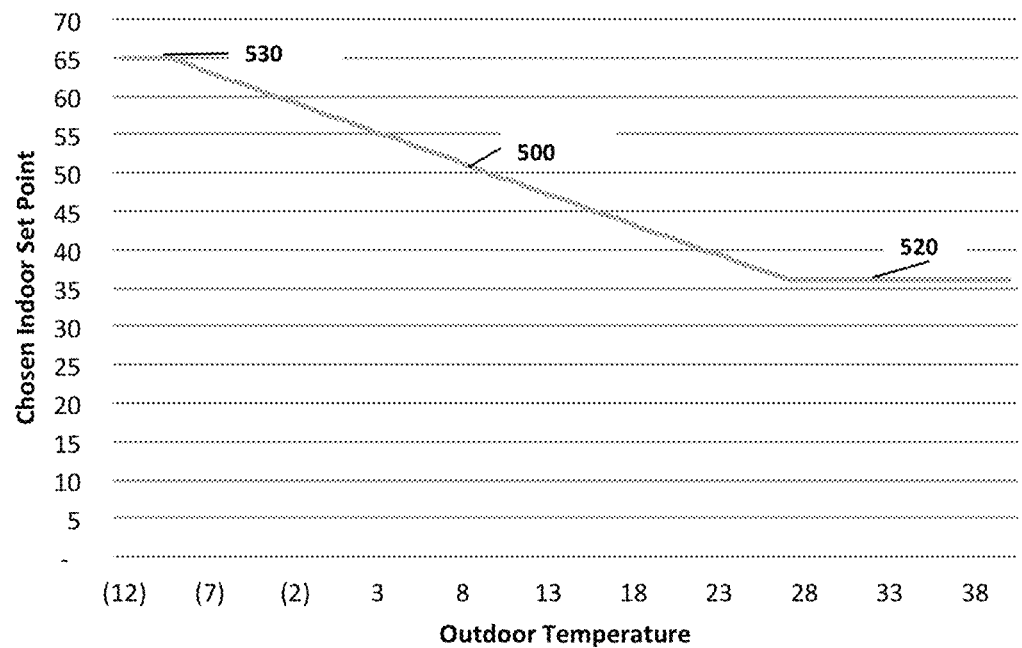
FIG. 5 is a graph illustrating the inverse relationship between heating system set points and various outdoor temperature readings that can result from activating the heating control system during periods of colder outdoor temperatures. It shows in detail an exemplary mathematical function that can result from utilizing this logic.

FIG. 5 shows an additional example of a graphical representation of the chosen set point (500) produced by the method described herein. The default set point (520) is 36, the maximum set point (530) is 65, and the slope of the line, which determines how quickly the computed set point changes as a function of outdoor temperature, is 0.8.

Figure 6:
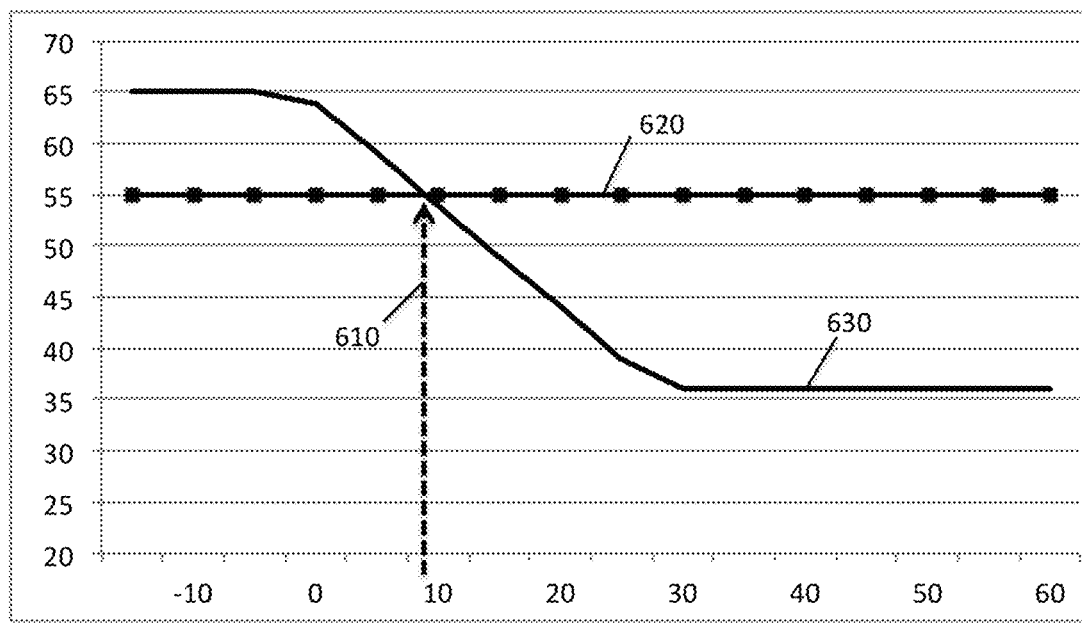
FIG. 6 shows a conventional fixed setback using a set point of 55° F. In contrast, an example of the set points resulting from utilizing one embodiment is shown.

FIG. 6 shows a conventional fixed setback (620) using a set point of 55° F. In contrast, an example of the set points resulting (630) from utilizing one embodiment of the present invention is shown. When the outdoor temperature indicator is above the freeze protection point, the default setting is chosen, in this case with a set point of 36° F. In this example, the computed indoor set points are shown increasing by 1° F. for each degree the outdoor temperature decreases below freezing. With an outdoor temperature reading of 10° F., the resulting indoor set point is 54° F. In this example, at all times when outdoor temperatures are above 9°, energy will be saved over the use of a conventional fixed setback of 55° F. For this computed set point function, FIG. 6 demonstrates this breakeven point (610). In this particular example, where a scaling factor of 1.0 is being used, only when outdoor temperatures decline below 9° will the present invention use more energy to protect the indoor space from freezing than a conventional fixed setback scheme of 55 degrees. The benefit from additional heating in this example, as outdoor temperatures decline below 9 degrees F., is increased protection against the risk of freezing.

Figure 7:
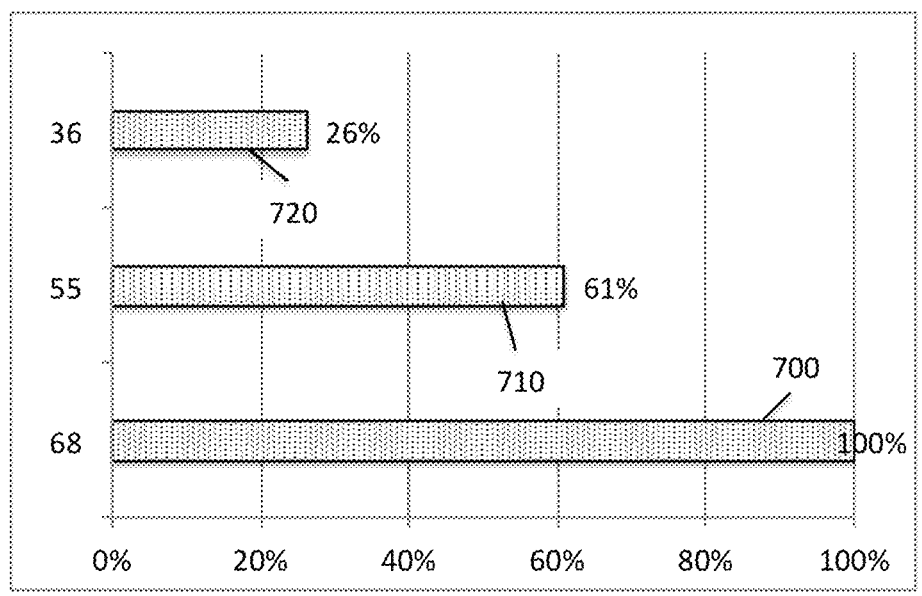
FIG. 7 shows a comparison of estimated relative costs for three different fixed thermostat settings. Costs are based on the US Department of Energy's approximation for savings achieved by turning down a thermostat during the heating season.

FIG. 7 shows a comparison of relative costs for three different fixed heating control system settings. These costs are based on the US Department of Energy's approximation for savings achieved by turning down a heating control system during the heating season. The first bar (700), is the base case. It considers as full cost, the energy needed to heat a home to 68°. The next bar (710), reflects 39% savings by setting the thermostat to a fixed setting of 55° for 24 hours per day. The cost of heating, in this example, is estimated to be 61% of the base case. During times (720) when the heating control system chooses the default set point, i.e. is set back to 36° for example, it is estimated that the energy cost could be reduced to 26% of the original base case.

Figure 8:
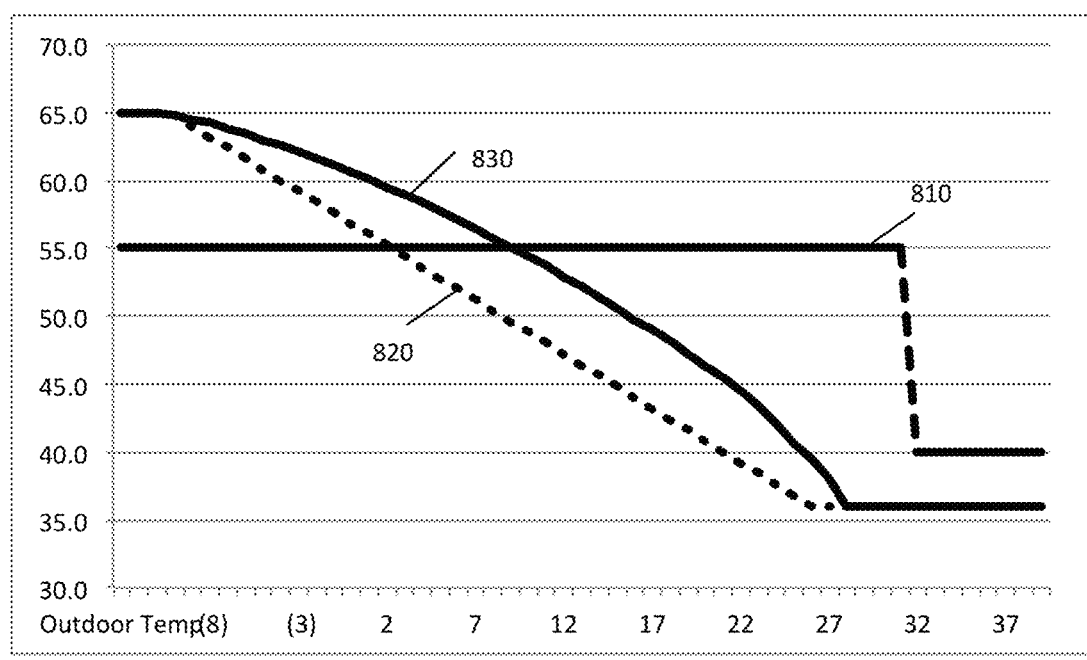
FIG. 8 shows three possible functions that describe a computed set point: one straight linear function, one curvilinear function, and one a stepped function.

FIG. 8 shows three different functions for determining set points across various outdoor temperatures. Persons of ordinary skill in the art will recognize that determining a computed set point can be accomplished using a linear function, or it can be accomplished utilizing one or more higher order factors to produce a curved function. One example of a curved function for computed set points is shown (830) in FIG. 8. Set point rates of change can vary across the range of outdoor temperatures, producing a curved response in computed set points to changes in outdoor temperature. Straight line functions are possible (820), as previously mentioned, as are stepped functions (810) that can occur by selecting a chosen set point using if-then-else logical determination methods.

EXAMPLES

The following examples describe particular, non-limiting embodiments of the described method and system. For simplicity, all of the examples use outdoor temperature as the outdoor temperature indicator. A person having ordinary skill in the art will readily understand how the other outdoor temperature indicators described herein can be utilized to run the method and determine computed set points.

Example 1

The system and method provides both a default set point, below which the system will not let the temperature fall; and a maximum set point, above which the system will not heat. The following examples use 36 degrees Fahrenheit as the default set point and 75 degrees as the maximum set point, but ordinarily skilled artisans will recognize that other set points can be selected for both the default and the maximum, as consistent with a user's requirements, the system and method, and the location of a structure. Scaling factors can be selected based on a user's requirements, the system and method, and the location of the system, and they can also vary as outdoor temperature readings change producing curvilinear functions.

Parameters:
P=freeze protection point
D=default set point (serves as default and minimum set point)
M=maximum set point
F=fail-safe set point
s=scaling factor; any real number between and including about 0.3 and about 3.0
To=outdoor temperature (obtained on-site or in proximity to the structure being heated; or via weather service)
C=computed set point General logic than can be used to determine a chosen set point:
IF To is not available, THEN F
IF To>=P, THEN D
IF To<P, THEN find C, (IF C cannot be determined, THEN F)
IF C<D, THEN D
IF C>=D, AND IF C<=M, THEN C
IF C>M, THEN M

Example 2

An exemplary method of controlling a heating system is described below.

Parameters:
P=32
D=36
M=75
F=55
s=1.0

Logic: Given outdoor temperature To=40, then the computed set point C=24. In this example, the chosen set point=36 or D, the default set point, since C<D. Since the outdoor temperature is warmer than the indoor set point, unnecessary active heating of the indoor space will be avoided.

Example 3

This example shows that the disclosed method can cause a heating control system to adjust indoor temperatures upward as outdoor temperatures decrease below a freeze protection point. In this example, a heating control system controls a heating system to heat a structure the same number of degrees above freezing that the outdoor temperature is below freezing, i.e, the method controlling the heating control system operates as a linear function where the scaling factor s=1.0.

Parameters:
P=32
D=36
M=75
F=55
s=1.0
To=22
C=42

Logic: Given outdoor temperature To=22, then the computed set point C=42 and the chosen set point is also 42 since D<C<M.

Since the outdoor temperature is obtainable and is below the freeze protection point P, a computed set point is determined. In this non-limiting example, the heating control system controls the heating system to regulate the temperature of the indoor space according to the chosen set point of 42 degrees. This result can be found on the function 400, FIG. 4.

Example 4

This example shows that the disclosed method can cause a heating control system to adjust indoor temperatures upward as outdoor temperatures decrease below a freeze protection point. In this example, a heating control system controls a heating system to heat a structure the same number of degrees above freezing that the outdoor temperature is below freezing, i.e, the method controlling the heating control system operates as a linear function where the scaling factor s=1.0.

Parameters:
P=32
D=36
M=75
F=55
s=1.0
To=45
C=19

Using the same logic as described in Example 1, when the outdoor temperature is 45 degrees Fahrenheit, the default set point is chosen because the outdoor temperature is above the freeze protection point P. If for some reason the freeze protection point is not used, a computed set point of 19 could still be determined; 19 is compared to a default set point D of 36 and a maximum set point M of 75; the default set point D is chosen because the computed set point falls below the default set point D.

Example 5

This example shows that the disclosed method can cause a heating control system to adjust indoor temperatures upward to a user-defined maximum set point as outdoor temperatures decrease well below a freeze protection point. In this example, a heating control system controls a heating system to heat a structure the same number of degrees above freezing that the outdoor temperature is below freezing until the maximum set point is reached, i.e, the method controlling the heating control system operates as a linear function where the scaling factor s=1.0, until the maximum set point is reached.

Parameters:
P=32
D=36
M=75
F=55
s=1.0
To=−25
C=89

Using the same logic as described in Example 1, when the outdoor temperature is −25 degrees Fahrenheit, a computed set point C of 89 is determined. In this example, the computed set point C of 89 is compared to the maximum set point M of 75; the maximum set point M is chosen because the computed set point C falls above the maximum set point M.

Example 6

In this example, the indoor temperature is raised 1.5 degrees for every degree that the outdoor temperature drops below the freeze protection point P.

Parameters:
P=32
D=36
M=75
F=55
s=1.5
To=22
C=47

Logic: Given outdoor temperature To=22, then the computed set point C=47 and the chosen set point is also 47 since D<C<M. This result can be found on the function 410, FIG. 4.

Example 7

In this example, the indoor temperature is raised 1.5 degrees for every degree that the outdoor temperature drops below the freeze protection point P.

Parameters:
P=32
D=36
M=75
F=55
s=1.5
To=45
C=47

When the outdoor temperature is 45 degrees Fahrenheit, i.e. at or above the freeze protection point, the danger of damage from freezing is not present, and the default set point D is chosen; and the heating system is controlled to provide heat, only as necessary, to keep the indoor space at the default set point D of 36 degrees Fahrenheit.

Example 8

This example shows that the disclosed method can cause a heating control system to adjust indoor temperatures upward to a user-defined maximum set point as outdoor temperatures decrease well below a freeze protection point. In this example, a heating control system controls a heating system to heat a structure until the maximum set point is reached. In this example, the computed set point is a linear function where the scaling factor s=1.5, until the maximum set point is reached.

Parameters:
P=32
D=36
M=75
F=55
s=1.5
To=−25
C=117.5

As a further alternative, when the outdoor temperature is −25 degrees Fahrenheit, a computed set point C of 117.5 is determined; 117.5 is compared to the maximum set point M of 75; the maximum set point is chosen because the computed set point C falls above the maximum set point M; and the heating control system controls the heating system to regulate the temperature of the indoor space according to the chosen set point of 75 degrees.

What is claimed is:

1. A heating system controller adapted for controlling a heating system for an indoor space, comprising:
    one or more processors adapted to:
    operate the controller at a set point value below 50 degrees Fahrenheit;
    automatically receive at least one outdoor weather indicator signal representing a measured or predicted outdoor weather condition;
    compute a computed set point value based at least in part on said outdoor weather indicator signal;
    compare the computed set point value to the set point value below 50 degrees Fahrenheit,
    and set the set point for the heating system controller to the greater of the set point value below 50 degrees or the computed set point value.

2. The controller of claim 1 wherein the outdoor weather indicator signal is based at least in part on an outdoor temperature indicator.

3. The controller of claim 2 wherein a source of at least one outdoor temperature indicator is located within a wall cavity or at an interior surface of a wall which separates the indoor space from outdoors.

4. The controller of claim 2 wherein the computed set point increases as the outdoor temperature indicator decreases.

5. The controller of claim 2 wherein the computed set point is based, at least in part, on a forecast.

6. The controller of claim 1 wherein the one or more processors are adapted to automatically receive indoor temperature indicator signals from at least two indoor temperature sensors.

7. The controller of claim 1 wherein the one or more processors are adapted to automatically send control signals wirelessly to a furnace control system.

8. The controller of claim 1 wherein the one or more processors are adapted to automatically send control signals directly to a furnace control system.

9. The controller of claim 8 wherein the one or more processors are-adapted to operate using negative control.

10. The controller of claim 1 wherein the one or more processors are adapted to automatically receive indoor temperature indicator signals from at least one indoor temperature sensor.

11. The controller of claim 1 wherein the heating system controller is placed in an off or standby mode when the outdoor temperature is above a protection point.

12. The controller of claim 1 wherein the computed set point is computed based on a difference between the outdoor weather indicator signal and a freeze protection point.

13. The controller of claim 1 wherein the one or more processors are-adapted to operate using negative control.

* * * * *